(12) United States Patent
Ding (10) Patent No.: US 10,321,048 B2
(45) Date of Patent: Jun. 11, 2019

(54) INTERACTION METHOD, INTERACTION APPARATUS, AND USER EQUIPMENT

(71) Applicant: BEIJING ZHIGU RUI TUO TECH CO., LTD., Beijing (CN)

(72) Inventor: Dayong Ding, Beijing (CN)

(73) Assignee: BEIJING ZHIGU RUI TUP TECH CO., LTD., Beijing (CN)

( * ) Notice: Subject to any disclaimer, the term of this patent is extended or adjusted under 35 U.S.C. 154(b) by 85 days.

(21) Appl. No.: 15/561,659

(22) PCT Filed: Mar. 4, 2016

(86) PCT No.: PCT/CN2016/075564
§ 371 (c)(1),
(2) Date: Sep. 26, 2017

(87) PCT Pub. No.: WO2016/155461
PCT Pub. Date: Oct. 6, 2016

(65) Prior Publication Data
US 2018/0077343 A1 Mar. 15, 2018

(30) Foreign Application Priority Data
Apr. 1, 2015 (CN) .......................... 2015 1 0151950

(51) Int. Cl.
*G06F 3/048* (2013.01)
*H04N 5/232* (2006.01)
*G06F 3/0484* (2013.01)

(52) U.S. Cl.
CPC ..... *H04N 5/23216* (2013.01); *G06F 3/04847* (2013.01); *H04N 5/23238* (2013.01); *H04N 5/23245* (2013.01)

(58) Field of Classification Search
CPC .................................................. H04N 5/23216
(Continued)

(56) References Cited

U.S. PATENT DOCUMENTS 5,353,077 A * 10/1994 Tanaka ..................... G03B 1/50
396/378
8,781,221 B2 * 7/2014 Ding ....................... G06F 3/017
382/164
(Continued)

FOREIGN PATENT DOCUMENTS

CN 103024261 A 4/2013
CN 104065882 A 9/2014
(Continued)

OTHER PUBLICATIONS

International Search Report and Written Opinion for Application No. PCT/CN2016/075564, dated Jun. 3, 2016, 7 pages.

*Primary Examiner* — Reza Nabi
(74) *Attorney, Agent, or Firm* — Sheppard Mullin Richter & Hampton LLP (57) ABSTRACT

Embodiments of the present application disclose an interaction method, an interaction apparatus, and user equipment. The method comprises: acquiring input information corresponding to a focal-length decreasing operation on an image collection device; and in response to that the image collection device is in a shortest focal-length state, triggering, at least according to the input information, the image collection device to enter a panoramic shooting mode. For technical solutions in the embodiments of the present application, a focal-length decreasing operation on an image collection device when the image collection device is in a shortest focal-length state is used to implement switching of the image collection device from a normal shooting mode to a panoramic shooting mode, so that use of a user becomes convenient, and also a use habit of the user is met, thereby improving user experience.

12 Claims, 4 Drawing Sheets

(58) Field of Classification Search
USPC .......................................................... 715/700
See application file for complete search history.

(56) References Cited

U.S. PATENT DOCUMENTS

| | | | | |
|---|---|---|---|---|
| 9,538,078 B2* | 1/2017 | Mehta | ................ | H04N 5/23238 |
| 2005/0237383 A1* | 10/2005 | Soga | ..................... | H04N 5/232 |
| | | | | 348/36 |
| 2008/0158342 A1* | 7/2008 | Jeong | ..................... | G03B 37/04 |
| | | | | 348/36 |
| 2008/0252717 A1* | 10/2008 | Moon | ..................... | G03B 37/04 |
| | | | | 348/36 |
| 2010/0165075 A1* | 7/2010 | Chou | ................ | H04N 5/23216 |
| | | | | 348/36 |
| 2011/0181687 A1* | 7/2011 | Yoshizumi | ........... | H04N 5/2252 |
| | | | | 348/36 |
| 2011/0261187 A1* | 10/2011 | Wang | ..................... | G01C 21/165 |
| | | | | 348/113 |
| 2012/0236173 A1* | 9/2012 | Telek | ..................... | G03B 17/08 |
| | | | | 348/223.1 |
| 2012/0294478 A1* | 11/2012 | Publicover | ......... | G06K 9/00604 |
| | | | | 382/103 |
| 2013/0070145 A1* | 3/2013 | Matsuyama | ....... | H04N 5/23216 |
| | | | | 348/333.12 |
| 2013/0093840 A1* | 4/2013 | Ichikawa | ........... | H04N 5/23232 |
| | | | | 348/36 |
| 2013/0276029 A1* | 10/2013 | Li | ..................... | H04N 21/482 |
| | | | | 725/38 |
| 2013/0278504 A1* | 10/2013 | Tong | ................... | G06K 9/00355 |
| | | | | 345/158 |
| 2014/0037134 A1* | 2/2014 | Tong | ................... | G06K 9/00355 |
| | | | | 382/103 |
| 2014/0118479 A1* | 5/2014 | Rapoport | ........... | H04N 1/00183 |
| | | | | 348/36 |
| 2015/0035941 A1* | 2/2015 | Chen | ................... | H04N 5/23238 |
| | | | | 348/36 |
| 2015/0049079 A1* | 2/2015 | Ding | ....................... | G06T 11/60 |
| | | | | 345/419 |
| 2015/0193088 A1* | 7/2015 | Ding | ..................... | G06F 3/0425 |
| | | | | 345/175 |
| 2015/0249785 A1* | 9/2015 | Mehta | ................ | H04N 5/23238 |
| | | | | 348/36 |
| 2015/0326793 A1* | 11/2015 | Makinen | ............ | H04N 5/23296 |
| | | | | 348/231.4 |
| 2016/0139595 A1* | 5/2016 | Yang | .................... | G05D 1/0016 |
| | | | | 701/2 |
| 2016/0180847 A1* | 6/2016 | Yang | ....................... | G10L 15/22 |
| | | | | 704/270.1 |
| 2016/0191793 A1* | 6/2016 | Yang | ................... | H04N 5/23222 |
| | | | | 348/207.11 |
| 2016/0353012 A1* | 12/2016 | Kao | .................. | H04N 5/23216 |
| 2016/0373637 A1* | 12/2016 | Zhou | ..................... | H04N 5/217 |
| 2016/0380679 A1* | 12/2016 | Xu | ....................... | H04B 7/0617 |
| | | | | 370/312 |
| 2016/0380691 A1* | 12/2016 | Xu | ........................... | H04B 7/10 |
| | | | | 370/329 |
| 2016/0381520 A1* | 12/2016 | Xu | ......................... | H04W 4/06 |
| | | | | 370/312 |
| 2017/0003741 A1* | 1/2017 | Ding | ....................... | G09G 5/00 |
| 2017/0003742 A1* | 1/2017 | Ding | ....................... | G06F 3/013 |
| 2017/0004372 A1* | 1/2017 | Ding | ....................... | G06F 1/00 |
| 2017/0004605 A1* | 1/2017 | Ding | ....................... | G06T 11/00 |
| 2017/0006217 A1* | 1/2017 | Ding | .................. | H04N 5/23219 |
| 2017/0006239 A1* | 1/2017 | Zhou | ..................... | H04N 5/347 |
| 2017/0031438 A1* | 2/2017 | Du | ......................... | G06F 3/147 |
| 2017/0041620 A1* | 2/2017 | Du | ......................... | H04N 19/132 |
| 2017/0150027 A1* | 5/2017 | Ding | ..................... | H04N 5/2354 |
| 2017/0161914 A1* | 6/2017 | Ding | ....................... | H04N 5/232 |
| 2017/0180474 A1* | 6/2017 | Ding | ....................... | G06F 16/27 |
| 2017/0187970 A1* | 6/2017 | Zhou | .................... | H04N 5/3535 |
| 2018/0067549 A1* | 3/2018 | Ding | ................... | G06F 3/01 |
| 2018/0077343 A1* | 3/2018 | Ding | ................ | H04N 5/23238 |

FOREIGN PATENT DOCUMENTS

| | | |
|---|---|---|
| CN | 104320581 A | 1/2015 |
| CN | 104461015 A | 3/2015 |

* cited by examiner

FIG. 6

INTERACTION METHOD, INTERACTION APPARATUS, AND USER EQUIPMENT

CROSS-REFERENCE TO RELATED APPLICATIONS

This application is a National Phase Application of International Application No. PCT/CN2016/075564, filed on Mar. 4, 2016, which claims the benefit of priority to Chinese Patent Application No. 201510151950.9, filed on Apr. 1, 2015, and entitled "Interactive Method, Interactive Apparatus and User Equipment". Both of the above-referenced applications are incorporated into the present application by reference herein in their entirety.

TECHNICAL FIELD

The present application relates to a human-machine interaction method, and in particular, to an interaction method, an interaction apparatus, and user equipment.

BACKGROUND

With the development of image processing technologies, more and more image collection devices are provided with a panoramic shoot function, and multiple photos shot in a panoramic shooting mode are spliced by using a predetermined image splicing algorithm to obtain a panoramic image having a wider angle of view. Generally, when a user needs to collect a panoramic image by using an image collection device having the panoramic shoot function, the user usually needs to find and operate a physical or virtual trigger module (for example, a physical button or a virtual touch key) corresponding to a panoramic shooting mode. In some possible scenarios, sometimes the user even needs to search levels of menus to find the trigger module corresponding to the panoramic shooting mode.

SUMMARY

A possible object of the embodiments of the present application is to provide a technical solution of human-machine interaction.

In a first aspect, a possible implementation solution of the present application provides an interaction method, comprising:

acquiring input information corresponding to a focal-length decreasing operation on an image collection device; and in response to that the image collection device is in a shortest focal-length state, triggering, at least according to the input information, the image collection device to enter a panoramic shooting mode.

In a second aspect, a possible implementation solution of the present application provides an interaction apparatus, comprising:

an input information acquisition module, configured to acquire input information corresponding to a focal-length decreasing operation on an image collection device; and a panoramic shooting trigger module, configured to: in response to that the image collection device is in a shortest focal-length state, trigger, at least according to the input information, the image collection device to enter a panoramic shooting mode.

In a third aspect, a possible implementation solution of the present application provides a user equipment, comprising the foregoing interaction apparatus.

In a fourth aspect, a possible implementation solution of the present application provides a computer readable storage device comprising executable instructions that, in response to execution, cause a device comprising a processor to perform operations, comprising:

acquiring input information corresponding to a focal-length decreasing operation on an image collection device; and in response to that the image collection device is in a shortest focal-length state, triggering, at least according to the input information, the image collection device to enter a panoramic shooting mode.

In at least one implementation solution of the embodiments of the present application, a focal-length decreasing operation on an image collection device when the image collection device is in a shortest focal-length state is used to implement switching of the image collection device from a normal shooting mode to a panoramic shooting mode, where because the focal-length decreasing operation on the image collection device is to obtain a wider shooting angle of view, and it may be regarded that panoramic shooting has a wider shooting angle of view than a shortest focal-length state does, by means of this implementation solution, an operation of a user becomes convenient, and also a use habit of the user is met, thereby improving user experience.

DETAILED DESCRIPTION

The specific implementation manners of the present application are further described in detail with reference to the accompanying drawings (a same reference numeral in several accompanying drawings represents a same element) and embodiments below. The embodiments below are used for describing the present application rather than to limit the scope of the present application.

A person skilled in the art can understand that terms such as "first" and "second" in the present application are only used to distinguish different steps, devices, modules or the like, and do not represent any specific technical meanings, and also do not indicate a certain logic order between the elements.

For a common image collection device having a panoramic shoot function, an operation to implement switching from a normal shooting mode (herein the normal shooting mode may be, for example, a shooting mode except a panoramic shooting mode) to a panoramic shooting mode is not very convenient, a use habit of a user is not met, and user experience is relatively poor.

Figure 1:
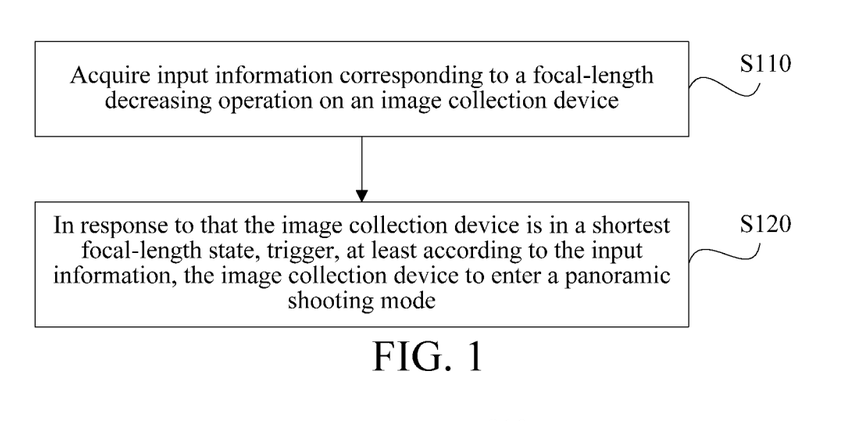
FIG. 1 is a flowchart of an interaction method according to an embodiment of the present application.

In view of this, as shown in FIG. 1, an implementation manner of an embodiment of the present application provides an interaction method, comprising:

S110: Acquire input information corresponding to a focal-length decreasing operation on an image collection device.

S120: In response to that the image collection device is in a shortest focal-length state, trigger, at least according to the input information, the image collection device to enter a panoramic shooting mode.

For example, an interaction apparatus provided in the present application is used as an execution body of this embodiment to execute S110 to S120. Specifically, the interaction apparatus may be set in user equipment in a manner of software, hardware or a combination of software and hardware, or, the interaction apparatus itself is the user equipment. The user equipment comprises, but is not limited to: image collection device with a photographing function such as: a digital camera, an intelligent mobile phone, intelligent glasses, and other electronic device that can control the image collection device.

In general, a focal-length decreasing operation on an image collection device can help obtain a wider shooting angle of view, and it may be regarded that panoramic shooting has a wider shooting angle of view than a shortest focal-length state does. Therefore, it meets a habit of thinking of a user to use a focal-length decreasing operation on an image collection device to trigger a panoramic shooting mode of the image collection device in the shortest focal-length state. Therefore, in an implementation manner of this embodiment of the present application, human-machine interaction for switching of a shooting mode is accomplished very naturally, and at the same time, an operation of a user becomes convenient, thereby improving user experience.

Steps in this embodiment of the present application are further described by using implementation manners below:

S110: Acquire input information corresponding to a focal-length decreasing operation on an image collection device.

In a possible implementation manner, the interaction apparatus can comprise a physical input mechanism, configured to control a focal length of the image collection device, and an operation on the physical input mechanism comprises the focal-length decreasing operation. For example, in a possible implementation manner, the physical control mechanism is a lever that can be pushed in two opposite directions, where a push in a direction is a focal-length increasing operation, and a push in the other direction is a focal-length decreasing operation.

In another possible implementation manner, the interaction apparatus can comprise a touch display module, and the touch display module may be configured to display a virtual control area for controlling the focal length, where an operation on the virtual control area comprises the focal-length decreasing operation.

In still another possible implementation manner, the interaction apparatus can comprise a gesture recognition module, and the gesture recognition module may be configured to recognize a focal-length decreasing or focal-length increasing gesture of a user. For example, in a possible implementation manner, the focal-length decreasing gesture is a mutual approaching motion of finger tips of two fingers of the user, and the focal-length increasing gesture is a mutual leaving motion of finger tips of two fingers of the user. In a possible implementation manner, the interaction apparatus comprises a touchpad, and the focal-length decreasing operation comprises:

a mutual approaching motion of at least two fingers of a user on the touchpad.

In another possible implementation manner, for example, the input information may further be acquired from at least one external device. For example, in a possible implementation manner, the at least one external device comprises a mobile phone, the interaction apparatus is a part of an image collect apparatus, and the mobile phone is configured to perform remote control on the image collect apparatus. Input information corresponding to the focal-length decreasing operation of a user on the mobile phone may be sent to the interaction apparatus by using the mobile phone.

S120: In response to that the image collection device is in a shortest focal-length state, trigger, at least according to the input information, the image collection device to enter a panoramic shooting mode.

In a possible implementation manner, the triggering, at least according to the input information, the image collection device to enter a panoramic shooting mode comprises:

generating a panoramic shooting trigger instruction at least according to the input information; and triggering, according to the panoramic shooting trigger instruction, the image collection device to enter the panoramic shooting mode.

In this implementation manner, for example, the interaction apparatus may be a part of the image collection device, or, the interaction apparatus itself is the image collection device. After the panoramic shooting trigger instruction is generated, the image collection device enters the panoramic shooting mode according to the panoramic shooting trigger instruction.

In another possible implementation manner, the triggering, at least according to the input information, the image collection device to enter a panoramic shooting mode comprises:

generating a panoramic shooting trigger instruction at least according to the input information; and sending the panoramic shooting trigger instruction to the image collection device.

In this implementation manner, for example, the interaction apparatus may not belong to the image collection device, and instead may be a part of another control device configured to control the image collection device, or the control device itself. For example, in a possible implementation manner, the image collection device may be a digital camera, the control device may be a mobile phone, a communication connection exists between the mobile phone and the digital camera, and shooting of the digital camera may be controlled by using the mobile phone. In this case, after acquiring the panoramic shooting trigger instruction, the mobile phone sends the panoramic shooting trigger instruction to the digital camera.

In a possible implementation manner, when the image collection device is in the shortest focal-length state, once the input information is obtained, the panoramic shooting trigger instruction is generated. The implementation manner may rapidly implement switching between a normal shooting mode and a panoramic shooting mode.

In some other possible implementation manners, to avoid forced and unexpected switching of the image collection device from a shooting mode to the panoramic shooting mode, optionally, before switching, a query is sent to a user to find out whether the user wants to perform switching or not, and switching is then performed after a positive reply is obtained, so that more friendly user experience is brought to the user. Therefore, in a possible implementation manner, the generating a panoramic shooting trigger instruction at least according to the input information comprises:

generating a panoramic trigger query instruction according to the input information, where the panoramic trigger query instruction is used for querying whether to enter the panoramic shooting mode;

acquiring feedback input information corresponding to the panoramic trigger query instruction; and in response to that the feedback input information corresponds to confirmation to enter the panoramic shooting mode, generating the panoramic shooting trigger instruction.

For example, in a possible implementation manner, the panoramic trigger query instruction may be presented to a user by using a pop-up box displayed on a display screen. In a possible implementation manner, for example, the pop-up box may further comprise a virtual confirmation key for confirming to enter the panoramic shooting mode, and a virtual rejection key for rejecting to enter the panoramic shooting mode. When the user touches a corresponding virtual key, the interaction apparatus obtains corresponding feedback input information.

Certainly, in another possible implementation manner, the panoramic trigger query instruction may be further presented to a user in another manner, for example, may be presented in a voice manner.

In a possible implementation manner, relatively naturally, the panoramic trigger query may be confirmed by that a user continues to perform the focal-length decreasing operation. In this implementation manner, the feedback input information comprises:

confirmation input information corresponding to continuing to perform the focal-length decreasing operation.

In this implementation manner, optionally, for example, a time threshold may further be set. For example, after the panoramic trigger query instruction is presented, within the time threshold, a user performing no operation or motion may also be used as a feedback input.

In a possible implementation manner, to enable a user to acquire more intuitively a shooting mode that the image collection device is currently in, optionally, the method may further comprise:

indicating a shooting state that the image collection device is in, where the shooting state comprises the panoramic shooting mode.

Figure 2:
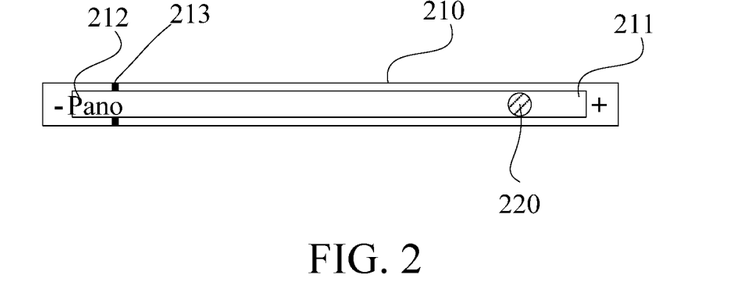
FIG. 2 is a schematic diagram of a shooting state displayed in an interaction method according to an embodiment of the present application.

For example, in a possible implementation manner, as shown in FIG. 2, the indicating a shooting state that the image collection device is in comprises:

displaying a status scroll bar 210, where an end 211 of the status scroll bar 210 represents that the image collection device is in a longest focal length state of a normal shooting mode, the other end 212 represents that the image collection device is in the panoramic shooting mode, and a set position 213 between the two ends represents that the image collection device is in a shortest focal-length state of the normal shooting mode; and displaying a current state pointer 220, where the current state pointer 220 is used for indicating, on the status scroll bar 210, a shooting state that the image collection device is currently in.

It can be seen by a person skilled in the art that, a part between the end 211 of the status scroll bar 210 and the set position 213 is used for indicating a focal length state of the image collection device, which is the same as or similar to a presentation generally used by a common image collection device to indicate a focal length state. It meets a use habit of a user to further add, on such a basis, an indication of the panoramic shooting mode on a side where a shortest focal-length state is far away from a longest focal length state.

Persons skilled in the art can understand that in the foregoing methods of specific implementation manners of the present application, the serial number of each step does not mean an execution sequence, and the execution sequence of each step should be determined according to the function and internal logic thereof, and should not constitute any limitation on the implementation procedure of the implementation manners of the present application.

Figure 3:
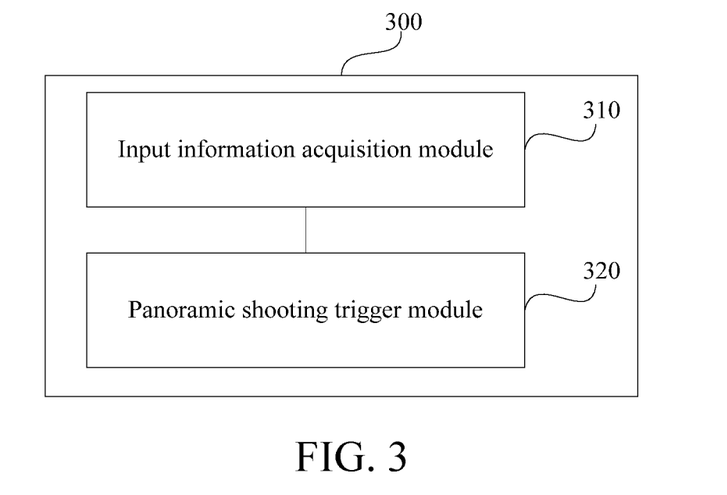
FIG. 3 is a schematic structural block diagram of an interaction apparatus according to an embodiment of the present application.

As shown in FIG. 3, a possible implementation manner of an embodiment of the present application further provides an interaction apparatus 300, comprising:

an input information acquisition module 310, configured to acquire input information corresponding to a focal-length decreasing operation on an image collection device; and a panoramic shooting trigger module 320, configured to: in response to that the image collection device is in a shortest focal-length state, trigger, at least according to the input information, the image collection device to enter a panoramic shooting mode.

In general, a focal-length decreasing operation on an image collection device can help obtain a wider shooting angle of view, and it may be regarded that panoramic shooting has a wider shooting angle of view than a shortest focal-length state does. Therefore, it meets a habit of thinking of a user to use a focal-length decreasing operation on an image collection device to trigger a panoramic shooting mode of the image collection device in the shortest focal-length state. Therefore, an implementation manner of this embodiment of the present application human-machine interaction for switching of a shooting mode is accomplished very naturally, and at the same time, an operation of a user becomes convenient, thereby improving user experience.

The modules and units of this embodiment of the present application are further described by using the following implementation manners.

Figure 4A:
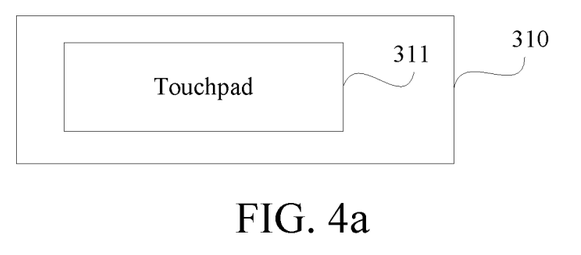
FIG. 4a is a schematic structural block diagram of an input information acquisition module of an interaction apparatus according to an embodiment of the present application.

In a possible implementation manner, the input information acquisition module 310 may acquire the input information by sensing a focal-length decreasing operation of a user by using a sensing device. For example, in a possible implementation manner, as shown in FIG. 4a, the input information acquisition module 310 comprises a touchpad 311 (the touchpad 311 may be a single touchpad that is not combined with a display function, or may also be a touch display screen combined with a display screen), where the touchpad 311 is configured to sense a touch operation of a user. The focal-length decreasing operation comprises:

a mutual approaching motion of at least two fingers of a user on the touchpad.

Certainly, in another possible implementation manner, the input information acquisition module 310 may comprise another sensing device to sense another operation of a user to obtain corresponding input information. For details, reference is made to corresponding description of the embodiment shown in FIG. 1.

In another possible implementation manner, for example, the input information acquisition module 310 may comprise a first communications unit, configured to acquire the input information from at least one external device.

Figure 4B:
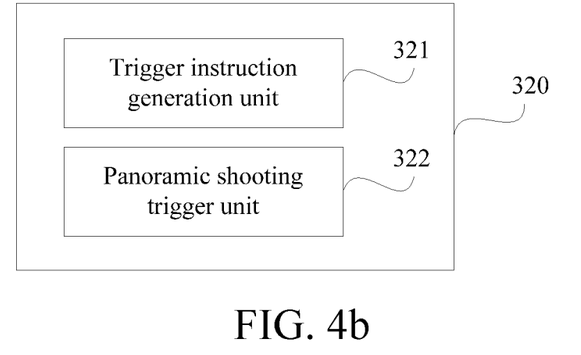
FIG. 4b and FIG. 4c are schematic structural block diagrams of two types of panoramic shooting trigger modules in an interaction apparatus according to an embodiment of the present application.

In a possible implementation manner, as shown in FIG. 4b, the panoramic shooting trigger module 320 comprises:

a trigger instruction generation unit 321, configured to generate a panoramic shooting trigger instruction at least according to the input information; and a panoramic shooting trigger unit 322, configured to trigger, according to the panoramic shooting trigger instruction, the image collection device to enter the panoramic shooting mode.

In this implementation manner, for example, the interaction apparatus may be a part of the image collection device, or, the interaction apparatus itself is the image collection device. After the panoramic shooting trigger instruction is generated, the image collection device enters the panoramic shooting mode according to the panoramic shooting trigger instruction.

Figure 4C:
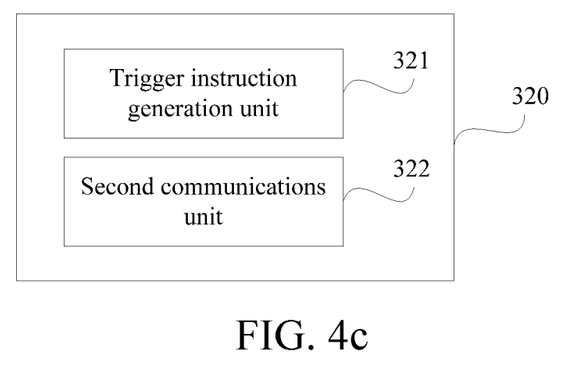

In a possible implementation manner, as shown in FIG. 4c, the panoramic shooting trigger module 320 comprises:

a trigger instruction generation unit 321, configured to generate a panoramic shooting trigger instruction at least according to the input information; and a second communications unit 322, configured to send the panoramic shooting trigger instruction to the image collection device.

In this implementation manner, for example, the interaction apparatus may not belong to the image collection device, and instead may be a part of another control device configured to control the image collection device, or the control device itself.

In a possible implementation manner, when the image collection device is in the shortest focal-length state, once the input information is obtained, the panoramic shooting trigger instruction is generated. The implementation manner may rapidly implement switching between a normal shooting mode and a panoramic shooting mode.

Figure 4D:
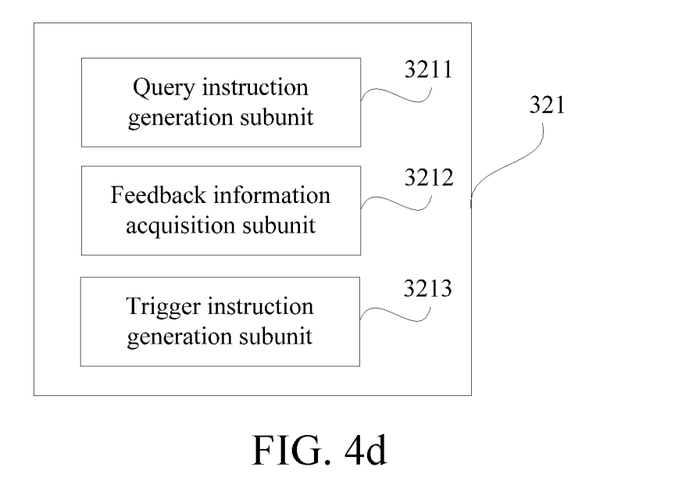
FIG. 4d is a schematic structural block diagram of a trigger instruction generation unit of an interaction apparatus according to an embodiment of the present application.

In some other possible implementation manners, to avoid forced and unexpected switching of the image collection device from a shooting mode to the panoramic shooting mode, optionally, before switching, a query is sent to a user to find out whether the user wants to perform switching, and switching is then performed after a positive reply is obtained, so that more friendly user experience is brought to the user. Therefore, in a possible implementation manner, as shown in FIG. 4d, the trigger instruction generation unit 321 comprises:

a query instruction generation subunit 3211, configured to generate a panoramic trigger query instruction according to the input information, where the panoramic trigger query instruction is used for querying whether to enter the panoramic shooting mode;

a feedback information acquisition subunit 3212, configured to acquire feedback input information corresponding to the panoramic trigger query instruction; and a trigger instruction generation subunit 3213, configured to: in response to that the feedback input information corresponds to confirmation to enter the panoramic shooting mode, generate the panoramic shooting trigger instruction.

In a possible implementation manner, relatively naturally, the panoramic trigger query may be confirmed by that a user continues to perform the focal-length decreasing operation. In this implementation manner, the feedback input information comprises:

confirmation input information corresponding to continuing to perform the focal-length decreasing operation.

Figure 4E:
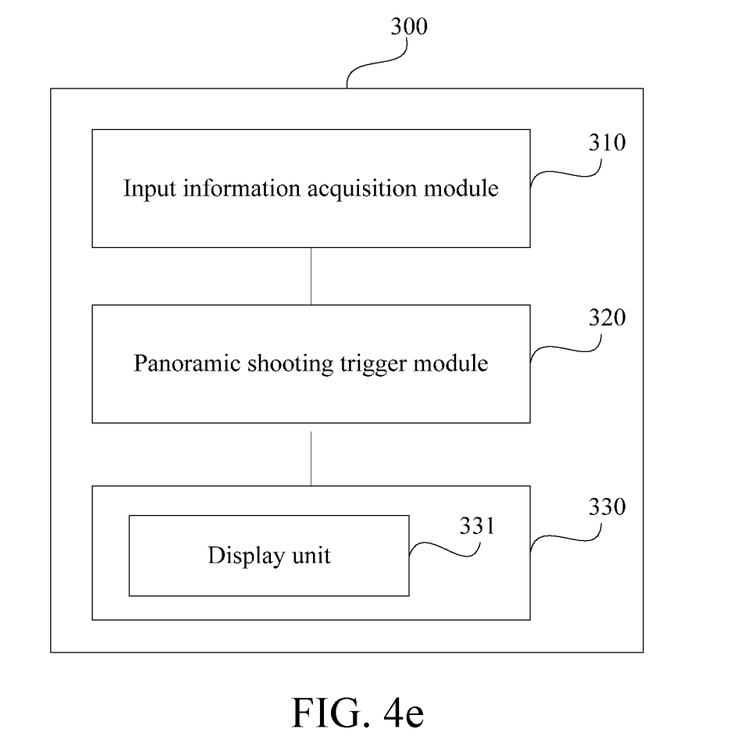
FIG. 4e is a schematic structural block diagram of an interaction apparatus according to an embodiment of the present application.

In a possible implementation manner, to enable a user to acquire more intuitively a shooting mode that the image collection device is currently in, optionally, as shown in FIG. 4e, the apparatus 300 further comprises:

a shooting state indication module 330, configured to indicate a shooting state that the image collection device is in, where the shooting state comprises the panoramic shooting mode.

In a possible implementation manner, the shooting state indication module 330 comprises a display unit 331, configured to:

display a status scroll bar, where an end of the status scroll bar represents that the image collection device is in a longest focal length state of a normal shooting mode, the other end represents that the image collection device is in the panoramic shooting mode, and a set position between the two ends represents that the image collection device is in a shortest focal-length state of the normal shooting mode; and display a current state pointer, where the current state pointer is used for indicating, on the status scroll bar, a shooting state that the image collection device is currently in.

For further description of content displayed by the display unit 331, reference is made to corresponding description of the embodiment shown in FIG. 2.

Reference is made to corresponding description of the embodiments shown in FIG. 1 and FIG. 2 for further description of the functions of the modules, units, and subunits in this embodiment of the present application, which are no longer elaborated herein.

Figure 5:
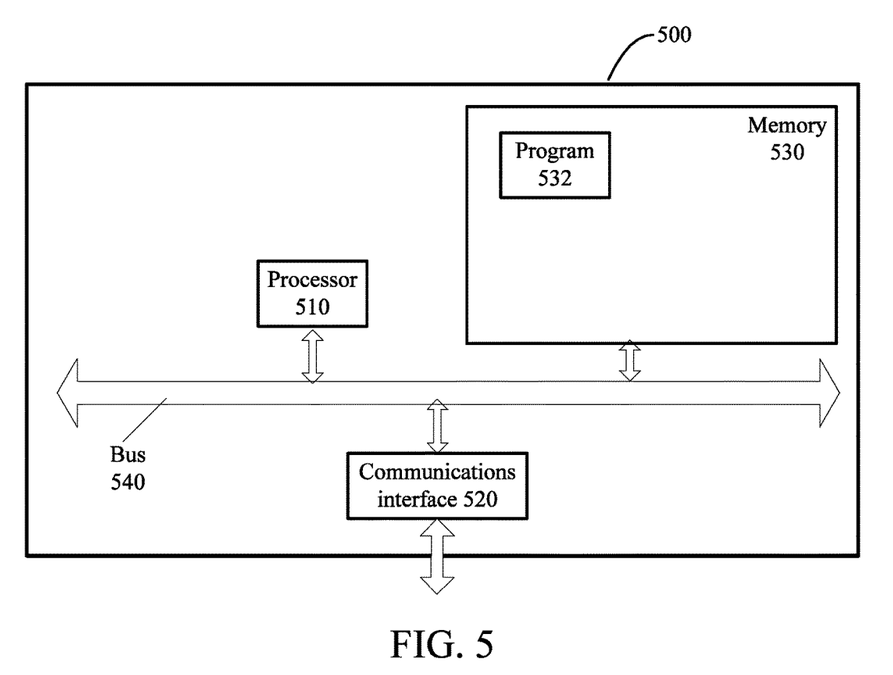
FIG. 5 is a schematic structural block diagram of an interaction apparatus according to an embodiment of the present application.

FIG. 5 is a schematic structural diagram of still another interaction apparatus 500 according to an embodiment of the present application. Specific implementation of the interaction apparatus 500 is not limited in a specific embodiment of the present application. As shown in FIG. 5, the interaction apparatus 500 may comprise:

a processor 510, a communications interface 520, a memory 530, and a communications bus 540.

The processor 510, the communications interface 520, and the memory 530 accomplish mutual communication by using the communications bus 540.

The communications interface 520 is configured to communicate with a network element such as a client.

The processor 510 is configured to execute a program 532, and may specifically execute related steps in the foregoing method embodiments.

Specifically, the program 532 may comprise program code, where the program code comprises a computer operation instruction.

The processor 510 may be a central processing unit (CPU), or an application specific integrated circuit (ASIC), or may be configured as one or more integrated circuits for implementing this embodiment of the present application.

The memory 530 is configured to store the program 532. The memory 530 may comprise a high-speed RAM memory, or may further comprise a non-volatile memory, for example, at least one magnetic disk memory. The program 532 may be specifically configured to cause the interaction apparatus 500 to execute the following steps:

acquiring input information corresponding to a focal-length decreasing operation on an image collection device; and in response to that the image collection device is in a shortest focal-length state, triggering, at least according to the input information, the image collection device to enter a panoramic shooting mode.

Reference may be made to corresponding description of corresponding steps and units in the foregoing embodiments for specific implementation of the steps in the program 532, which are not elaborated herein. A person skilled in the art may clearly understand that, for convenience and simplicity of description, reference may be made to a corresponding process description in the foregoing method embodiments for specific working processes of the devices and modules described above, which are no longer elaborated herein.

Figure 6:
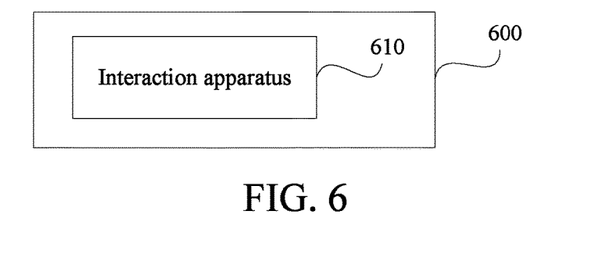
FIG. 6 is a schematic structural block diagram of user equipment according to an embodiment of the present application.

As shown in FIG. 6, a possible implementation manner of an embodiment of the present application provides a user device or equipment 600, where the user equipment 600 comprises an interaction apparatus 610. The interaction apparatus 610 may be any interaction apparatus in the embodiments shown in FIG. 3 or FIG. 4a~4e.

In a possible implementation manner, the user equipment 600 may be one of the following: image collection devices having a photographing function such as a digital camera, an intelligent mobile phone, intelligent glasses, and another electronic device that can control the image collection device.

The inventor of the present application finds that, generally speaking, a focal-length decreasing operation on an image collection device is to obtain a wider shooting angle of view, and it may be regarded that panoramic shooting has a wider shooting angle of view than a shortest focal-length state does. Therefore, it meets a habit of thinking of a user to use a focal-length decreasing operation on an image collection device to trigger a panoramic shooting mode of the image collection device in the shortest focal-length state. Therefore, an implementation manner of this embodiment of the present application human-machine interaction for switching of a shooting mode is accomplished very naturally, and at the same time, an operation of a user becomes convenient, thereby improving user experience.

It can be appreciated by those skilled in the art that each exemplary units and method steps described with reference to the embodiments disclosed in this text can be implemented by electronic hardware or a combination of computer software and electronic hardware. Whether these functions are executed in a hardware mode or a software mode depends on the specific applications and design constraint conditions of the technical solutions. The professional technicians can use different methods to implement the functions described with respect to each specific application, but this implementation should not be considered to go beyond the scope of the present application.

If the functions are implemented in the form of a software functional unit and is sold or used as an independent product, it can be stored in a computer-readable storage medium. Based on such understanding, the technical solution of the present application essentially or the part which contributes to the prior art or a part of the technical solution can be embodied in the form of a software product, and the computer software product is stored in a storage medium, and comprises several instructions for enabling a computer device (which can be a personal computer, a server, or network equipment, etc.) to execute all or some steps of the method described in each embodiment of the present application. The foregoing storage medium comprises various media which can store a program code, such as a USB disk, a mobile hard disk, a read-only memory (ROM), a random access memory (RAM), a magnetic disk or a compact disk.

The above implementations are only used to describe the present application, without limiting the present application; various alterations and variants can be made by those skilled in the art without departing from the spirit and scope of the present application, so all equivalent technical solutions also belong to the scope of the present application, and the scope of patent protection of the present application should be defined by claims.

What is claimed is:

1. An interaction method, comprising:
acquiring input information corresponding to a focal-length decreasing operation on an image collection device;
generating a panoramic shooting trigger instruction at least according to the input information;
triggering, according to the panoramic shooting trigger instruction, the image collection device to enter a panoramic shooting mode;
indicating a shooting state that the image collection device is in, wherein the shooting state comprises the panoramic shooting mode;
displaying a status scroll bar, wherein an end of the status scroll bar represents that the image collection device is in a longest focal length state of a normal shooting mode, the other end represents that the image collection device is in the panoramic shooting mode, and a set position between the two ends represents that the image collection device is in a shortest focal-length state of the normal shooting mode; and
displaying a current state pointer, wherein the current state pointer is for indicating, on the status scroll bar, the shooting state.

2. The method as claimed in claim 1, wherein the triggering the image collection device to enter a panoramic shooting mode further comprises:
sending the panoramic shooting trigger instruction to the image collection device.

3. The method as claimed in claim 1, wherein the generating a panoramic shooting trigger instruction at least according to the input information comprises:
generating a panoramic trigger query instruction according to the input information, where the panoramic trigger query instruction is used for querying whether to enter the panoramic shooting mode;
acquiring feedback input information corresponding to the panoramic trigger query instruction; and
in response to that the feedback input information corresponds to confirmation to enter the panoramic shooting mode, generating the panoramic shooting trigger instruction.

4. The method as claimed in claim 3, wherein the feedback input information comprises:
confirmation input information corresponding to continuing to perform the focal-length decreasing operation.

5. The method as claimed in claim 1, wherein the focal-length decreasing operation comprises:
a mutual approaching motion of at least two fingers of a user on a touchpad.

6. An interaction apparatus, comprising:
an input information acquisition module, configured to acquire input information corresponding to a focal-length decreasing operation on an image collection device;
a trigger instruction generation unit, configured to generate a panoramic shooting trigger instruction at least according to the input information;

a panoramic shooting trigger unit, configured to trigger, according to the panoramic shooting trigger instruction, the image collection device to enter a panoramic shooting mode;

a shooting state indication module, configured to indicate a shooting state that the image collection device is in, where the shooting state comprises the panoramic shooting mod; and a display unit, configured to:
  display a status scroll bar, wherein an end of the status scroll bar represents that the image collection device is in a longest focal length state of a normal shooting mode, the other end represents that the image collection device is in the panoramic shooting mode, and a set position between the two ends represents that the image collection device is in a shortest focal-length state of the normal shooting mode; and
  display a current state pointer, wherein the current state pointer is for indicating, on the status scroll bar, the shooting state.

7. The apparatus as claimed in claim 6, wherein the panoramic shooting trigger module further comprises:
  a communications unit, configured to send the panoramic shooting trigger instruction to the image collection device.

8. The apparatus as claimed in claim 6, wherein the trigger instruction generation unit comprises:
  a query instruction generation subunit, configured to generate a panoramic trigger query instruction according to the input information, where the panoramic trigger query instruction is used for querying whether to enter the panoramic shooting mode;
  a feedback information acquisition subunit, configured to acquire feedback input information corresponding to the panoramic trigger query instruction; and
  a trigger instruction generation subunit, configured to: in response to that the feedback input information corresponds to confirmation to enter the panoramic shooting mode, generate the panoramic shooting trigger instruction.

9. The apparatus as claimed in claim 8, wherein the feedback input information comprises:
  confirmation input information corresponding to continuing to perform the focal-length decreasing operation.

10. The apparatus as claimed in claim 6, wherein the focal-length decreasing operation comprises:
  a mutual approaching motion of at least two fingers of a user on a touchpad.

11. A user equipment, comprising the interaction apparatus as claimed in claim 6.

12. A non-transitory computer readable storage device comprising executable instructions that, in response to execution by a processor of a user device, cause the user device comprising the processor to perform operations, comprising:
  acquiring input information corresponding to a focal-length decreasing operation on an image collection device;
  generating a panoramic shooting trigger instruction at least according to the input information;
  triggering, according to the panoramic shooting trigger instruction, the image collection device to enter a panoramic shooting mode;
  indicating a shooting state that the image collection device is in, wherein the shooting state comprises the panoramic shooting mode;
  displaying a status scroll bar, wherein an end of the status scroll bar represents that the image collection device is in a longest focal length state of a normal shooting mode, the other end represents that the image collection device is in the panoramic shooting mode, and a set position between the two ends represents that the image collection device is in a shortest focal-length state of the normal shooting mode; and
  displaying a current state pointer, wherein the current state pointer is for indicating, on the status scroll bar, the shooting state.

\* \* \* \* \*

UNITED STATES PATENT AND TRADEMARK OFFICE
CERTIFICATE OF CORRECTION

PATENT NO. : 10,321,048 B2
APPLICATION NO. : 15/561659
DATED : June 11, 2019
INVENTOR(S) : Dayong Ding It is certified that error appears in the above-identified patent and that said Letters Patent is hereby corrected as shown below:

On the Title Page

Assignee, item (73):
"BEIJING ZHIGU RUI TUP TECH CO., LTD." should read -- BEIJING ZHIGU RUI TUO TECH CO., LTD. --.

Signed and Sealed this
Twelfth Day of November, 2019

Andrei Iancu
*Director of the United States Patent and Trademark Office*